Aug. 19, 1952     E. R. DOEPKE     2,607,622
HOSE ATTACHMENT
Filed March 3, 1950
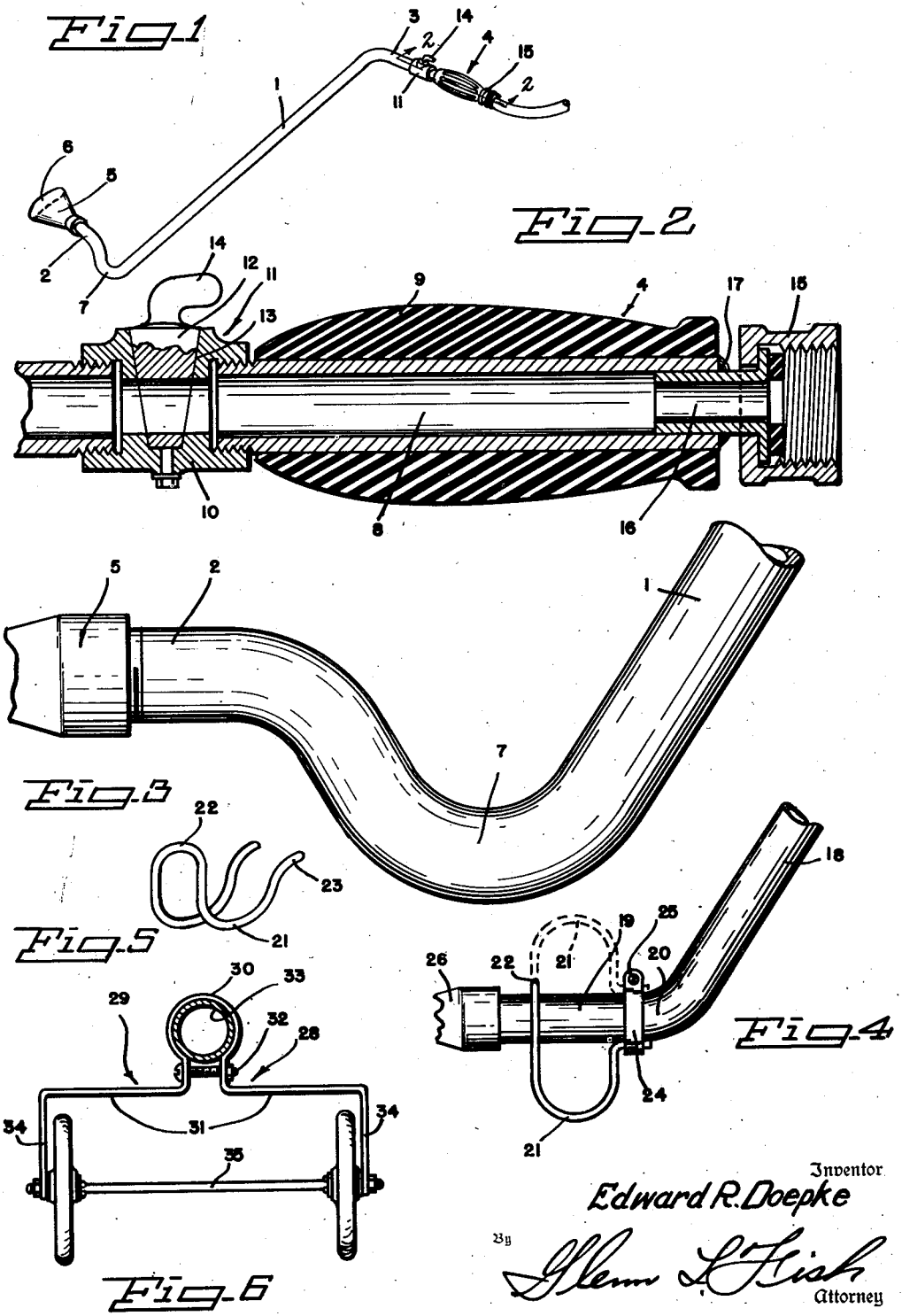
Inventor
Edward R. Doepke
By
Glenn L. Fish
Attorney Patented Aug. 19, 1952

2,607,622

UNITED STATES PATENT OFFICE 2,607,622

HOSE ATTACHMENT

Edward R. Doepke, Walla Walla, Wash.; Leila M. Doepke, executrix of said Edward R. Doepke, deceased, assignor to Leila M. Doepke, Walla Walla, Wash.

Application March 3, 1950, Serial No. 147,400

3 Claims. (Cl. 299—47)

1

This invention relates to a hose attachment and it is one object of the invention to provide an attachment consisting of a tube which may be connected with a garden hose and used for discharging water and driving leaves and other loose trash from a lawn or as an extension by means of which water may be discharged close to the ground and plants watered near their roots without their leaves or flowers being struck and damaged by a stream of water.

Another object of the invention is to provide a hose attachment consisting of a tube of stiff metal having a nozzle at its front end and having its rear end connected with a nipple or handle by a valve by means of which flow of water through the attachment may be controlled, the handle being surrounded by a rubber hand grip and carrying at its rear end a hose-engaging coupling.

Another object of the invention is to provide the tubular extension with a fulcrum upon which it may be rocked and its nozzle thus tilted vertically and directional flow of water from the nozzle controlled, the fulcrum also allowing the tube to be readily moved along the ground when it is in use.

With these and other objects in view the invention consists of a special construction and arrangement of parts illustrated in the accompanying drawings wherein:

Fig. 1 is a perspective view of the hose connection.

Fig. 2 is a sectional view upon an enlarged scale taken along the line 2—2 of Figure 1.

Fig. 3 is a side elevation of the front end portion of the tubular attachment.

Fig. 4 is a side elevation showing a modified form of fulcrum.

Fig. 5 is a perspective view of the fulcrum shown in Figure 4.

Fig. 6 is a view showing a tube in cross section and carrying a combination carriage and fulcrum.

The tube 1 constituting the major element of this hose attachment has its front and rear end portions bent to form a forwardly extending shank 2 at the front or lower end of the tube and a rearwardly extending shank 3 at the rear or upper end of the tube. The tube is formed of stiff metal and is of such length that after it has been bent to form the two shanks 2 and 3 it may be conveniently held by a handle 4 connected with the upper shank and have the nozzle 5 carried by its lower shank disposed close to the ground. The nozzle flares towards its front end and is flattened to form a transversely elongated mouth 6 through

2 which a flat stream of water is discharged. It will be understood that the nozzle may have a head or wall at its front end through which a multiplicity of openings are formed and thus cause the water to be discharged in streams forming a spray if so desired. The bend 7 between the shank 2 and the lower end of the tube 1 is arcuate longitudinally and when it is resting upon the ground it serves as a fulcrum upon which the device may be rocked to raise or lower the nozzle. This fulcrum or curved bend also allows the device to be easily slid along the ground in order to move the shank 2 and the nozzle longitudinally in a forward or rearward direction or swing the shank transversely. It will thus be seen that during use of the device it may be readily manipulated and water discharged directly against the ground or short grass for driving leaves or trash off of a lawn or if the device is being used for watering bushes or plants having leaves or flowers which are liable to be damaged if struck by a stream of water discharged from the nozzle, the water may be directed against the ground close to roots of the plants or against the stems of the plants near their roots without striking and damaging the leaves or flowers.

The handle 4 by means of which the device is held and manipulated consists of a short pipe or tubular nipple or core 8 which is formed of metal and carries a grip 9 formed of soft rubber or other suitable material. The front end portion of the nipple 8 is externally threaded and this end of the nipple is screwed into the rear end of the casing 10 of a valve 11. The valve casing has its front end screwed upon the rear end of the shank 3 and the plug 12 is rotatably mounted in the tapered socket 13 and provided with a key or handle 14 so that this valve may be opened or closed by a person grasping the handle 4 and manipulating the device. A hose-engaging coupling 15 extends rearwardly from the handle and has the usual shank 16 which is fitted into the rear end portion of the nipple 8 and is welded to the nipple, as shown at 17.

This device is of light weight and may be readily held by its handle with the bend or fulcrum 7 resting upon the ground and easily moved forwardly or rearwardly or transversely in order to control directional flow of water while driving leaves or loose trash from a lawn or watering the roots of bushes or plants having leaves or flowers which would be liable to be damaged by the force of a stream of water.

In Figure 4 there has been shown a modified construction wherein the tube 18 has its front end portion bent to form a shank 19 which is straight throughout its length, instead of being curved upwardly, and connected with the lower end of the tube by a short bend 20. A fulcrum 21 is carried by the shank 19 and is formed from a strand of stiff wire and has its front end 22 engaged about the shank transversely thereof and its rear end 23 connected with a clamp 24. This clamp is formed of resilient metal and fits about the shank 19 and when its screw 25 is tightened the fulcrum will be held against movement along or about the shank. When the screw is loosened the fulcrum may be swung about the shank to the inoperative position indicated by dotted lines in Figure 4 and the screw again tightened so that the fulcrum will be held in the adjusted position where it will be out of the way and allow the shank and the nozzle 26 carried thereby to be disposed very close to or in direct contact with the ground.

In Figure 6 there has been shown a fulcrum or carriage 28 which is used in place of the fulcrum shown in Figure 4. This fulcrum has a frame or bracket 29 formed from a strip of resilient metal which is bent midway its length to form a circular clamp 30 having arms 31 extending from opposite sides thereof. A screw 32 is provided for contacting the clamp and holding it in tight gripping engagement with the nozzle 33 which corresponds to the nozzle 19. Outer end portions 34 of the arms 31 are bent downwardly and formed with openings through which are passed ends of an axle 35 carrying wheels. These wheels rest upon the ground and allow the hose attachment to be easily moved forwardly or rearwardly and also tilted vertically.

Having thus described the invention, what is claimed is:

1. A hose attachment comprising an elongated stiff inclined tube having a lower end portion bent forwardly and forming a front shank and an upper portion bent rearwardly and forming a rear shank, a nozzle carried by and projecting forwardly from the front shank, a fulcrum adapted to slidably rest upon the ground and consisting of a strand bent to form an arcuate bridge merging into front and rear upwardly extending arms, the front arm being engaged about the front shank and the rear arm being connected with a clamp secured about the tube, said clamp holding the fulcrum in place under the front shank providing a runner for slidably supporting the hose attachment spaced above the ground, and a hose-engaging coupling at the rear end of the upper shank.

2. A hose attachment comprising an elongated stiff tube having a lower end portion bent forwardly and forming a front shank and an upper portion bent rearwardly and forming a rear shank, a nozzle carried by and projecting forwardly from the front shank, a fulcrum normally disposed under said front shank and adapted to provide a runner for slidably supporting the hose attachment spaced above the ground, said fulcrum mounted for swinging movement about said front shank to an inoperative position above the shank, and a hose-engaging coupling at the rear end of the upper shank.

3. A hose attachment comprising an elongated stiff tube angled upwardly at a rearward incline, the lower end portion of said tube being bent forwardly forming a front shank adapted to receive a nozzle, the upper end portion of said tube being bent rearwardly forming a rear shank adapted to receive a valve, a valve on said rear shank communicating therewith, a tubular handle communicating with said valve and positioned in axial alignment with said rear shank, a hand grip about said handle, said handle being adapted to couple with a hose, a fulcrum consisting of a strand of wire bent to form an arcuate bridge merging into front and rear upwardly extending transversely spaced arms, said front arms being engaged about the front shank transversely thereof and the rear arms being connected with a releasable clamp, whereby the fulcrum provides a runner for slidably supporting the hose attachment spaced above the ground.

EDWARD R. DOEPKE.

REFERENCES CITED

The following references are of record in the file of this patent:

UNITED STATES PATENTS

| Number | Name | Date |
| --- | --- | --- |
| 845,709 | Gladding | Feb. 26, 1907 |
| 1,724,702 | Flickinger | Aug. 13, 1929 |
| 1,877,388 | Coelho | Sept. 13, 1932 |
| 1,933,919 | McPherson | Nov. 7, 1933 |
| 1,949,904 | Guedel | Mar. 6, 1934 |
| 2,289,889 | Stick et al. | July 14, 1942 |